(12) United States Patent
Psarologos et al.

(10) Patent No.: US 10,376,091 B2
(45) Date of Patent: Aug. 13, 2019

(54) COFFEE GRINDER APPARATUS

(71) Applicant: BREVILLE PTY LIMITED, Alexandria, New South Wales (AU)

(72) Inventors: Con Psarologos, Bardwell Valley (AU); David Davenport, Lane Cove (AU); Richard Hoare, Lane Cove (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 230 days.

(21) Appl. No.: 15/185,024

(22) Filed: Jun. 17, 2016

(65) Prior Publication Data

US 2016/0296061 A1 Oct. 13, 2016

Related U.S. Application Data

(63) Continuation of application No. 13/145,777, filed on Jul. 21, 2011, now abandoned.

(51) Int. Cl.
*A47J 31/42* (2006.01)
*A47J 31/44* (2006.01)

(52) U.S. Cl.
CPC ........... *A47J 31/42* (2013.01); *A47J 31/4464* (2013.01)

(58) Field of Classification Search
CPC .... A47J 31/42; A47J 31/3609; A47J 31/4464; A47J 42/40; A47J 42/44
USPC .......... 99/279, 280, 282, 285, 286, 295, 300
See application file for complete search history.

(56) References Cited

U.S. PATENT DOCUMENTS

| | | | |
|---|---|---|---|
| 3,119,322 A * | 1/1964 | Valente | A47J 31/007 99/291 |
| 3,575,560 A | 4/1971 | Mayer et al. | |
| 4,644,856 A * | 2/1987 | Borgmann | A47J 31/4464 210/455 |
| 4,787,299 A * | 11/1988 | Levi | A47J 31/0657 99/285 |

(Continued)

FOREIGN PATENT DOCUMENTS

| CH | 660288 A5 | 4/1987 |
|---|---|---|
| CN | 1032736 A | 5/1989 |

(Continued)

OTHER PUBLICATIONS

International Search Report and Written Opinion for PCT/AU2010/000087, dated Apr. 10, 2010.

(Continued)

*Primary Examiner* — Thien S Tran
(74) *Attorney, Agent, or Firm* — Marshall, Gerstein & Borun LLP

(57) ABSTRACT

An espresso machine has a built-in coffee grinder. A coffee grinding apparatus cooperates with a removable portafilter having a handle, the apparatus including: a cradle for supporting the portafilter; an actuator adjacent to the cradle for co-operating with the portafilter; a downward facing ledge engages a front tab of the portafilter for resisting imbalance of the portafilter when supported by the cradle. Wherein, when the portafilter is supported by the cradle and advanced forward, the front tab of the portafilter further contacts the actuator to operate an electrical switch, thereby causing a signal to be sent to a microprocessor for delivering coffee grinds to the portafilter.

14 Claims, 15 Drawing Sheets

(56) References Cited

U.S. PATENT DOCUMENTS

| | | | |
|---|---|---|---|
| 5,007,333 A | 4/1991 | Sager | |
| 5,111,740 A * | 5/1992 | Klein | A47J 31/005 99/295 |
| 5,186,096 A * | 2/1993 | Willi | A47J 31/36 219/433 |
| 5,463,933 A * | 11/1995 | Landais | A47J 31/0657 99/285 |
| 5,615,601 A | 4/1997 | Eugstar | |
| 5,642,656 A * | 7/1997 | Braendle | A47J 31/0663 99/295 |
| 5,645,230 A | 7/1997 | Marogna et al. | |
| 5,650,186 A | 7/1997 | Annoni et al. | |
| 5,718,163 A * | 2/1998 | Termini | A47J 42/00 241/34 |
| 5,870,943 A * | 2/1999 | Levi | A47J 31/0647 99/287 |
| 5,992,298 A * | 11/1999 | Illy | A47J 31/36 99/281 |
| 6,067,894 A * | 5/2000 | Eugster | A47J 31/404 99/280 |
| 6,095,032 A * | 8/2000 | Barnett | A47J 31/404 100/145 |
| 6,357,345 B1 | 3/2002 | Cusenza et al. | |
| 6,572,036 B2 | 6/2003 | Glucksman et al. | |
| 6,581,511 B2 | 6/2003 | Cusenza et al. | |
| 6,700,340 B2 | 3/2004 | Wong et al. | |
| 6,857,354 B2 * | 2/2005 | Reyhanloo | A47J 42/44 99/280 |
| 7,455,867 B1 * | 11/2008 | Gutwein | A23F 5/243 426/433 |
| 7,874,505 B1 * | 1/2011 | Lassota | A47J 42/38 241/259.1 |
| 2003/0005826 A1 | 1/2003 | Sargent et al. | |
| 2006/0117960 A1 * | 6/2006 | Fischer | A47J 31/3614 99/279 |
| 2007/0261563 A1 * | 11/2007 | Morin | A47J 31/60 99/279 |
| 2008/0050480 A1 * | 2/2008 | Doglioni Majer | A47J 31/3609 426/231 |
| 2009/0293733 A1 * | 12/2009 | Martin | A47J 31/60 99/280 |
| 2011/0097454 A1 * | 4/2011 | Coccia | A47J 31/36 426/231 |
| 2011/0153739 A1 * | 6/2011 | McCoy | H01R 13/6683 709/204 |
| 2013/0167729 A1 * | 7/2013 | Hoare | A47J 31/44 99/280 |
| 2016/0128507 A1 * | 5/2016 | Grassia | B30B 15/144 99/280 |

FOREIGN PATENT DOCUMENTS

| | | |
|---|---|---|
| EP | 0245197 A2 | 11/1987 |
| EP | 0312901 A1 | 4/1989 |
| WO | WO-2006/133699 A2 | 12/2006 |

OTHER PUBLICATIONS

International Preliminary Report on Patentability issued in PCT/AU2010/000087, dated Aug. 2, 2011.
Seventh Office Action issued in Australian Patent Application No. 2010207886, dated Feb. 12, 2016.
Sixth Office Action issued Australian Patent Application No. 2010207886, dated Oct. 20, 2015.
Fifth Office Action issued in Australian Patent Application No. 2010207886, dated Jul. 23, 2015.
Fourth Office Action issued in Australian Patent Application No. 2010207886, dated May 5, 2016.
Third Office Action issued in Australian Patent Application No. 2010207886, dated Feb. 26, 2015.
Second Office Action issued in Chinese Patent Application No. 2010207886, dated Jan. 15, 2015.
First Office Action issued in Australian Patent Application No. 2010207886, dated Dec. 11, 2014.
Office Action issued in Australian Patent Application No. 2016203881, dated Mar. 9, 2017.
Second Chinese Office Action issued in Chinese Patent Application No. 201510500733.6, dated Jul. 21, 2017.
Office Action issued in Chinese Patent Application No. 201080008807.X, dated Aug. 1, 2013.
Office Action issued in Chinese Patent Application No. 201080008807.X, dated May 5, 2014.
Office Action issued in Chinese Patent Application No. 201080008807.X, dated Oct. 21, 2014.
Extended European Search Report for European Patent Application No. 10735432.6, dated Apr. 24, 2014.
Office Action issued in European Patent Application No. 10735432.6, dated Jan. 18, 2017.
Office Action issued in Russian Patent Application No. 2011135818.
Operating Instructions K30 Twin Espresso Grinder (retrieved Sep. 6, 2018), https://www.manualslib.com/manual/754738/Mahlkonig-K30-Twin.html.
Single Espresso Grinder [retrieved on Mar. 3, 2010] Retrieved from the Internet <URL http://web.archive.org/web/20080719070932/http://www.globalcoffee.com.au/CoffeeMachines/Commercial/Traditional/Mahlkonig_K3OES.aspx>.
Office Action issued in European Patent No. 10 735 432.6, dated Nov. 29, 2018.

* cited by examiner

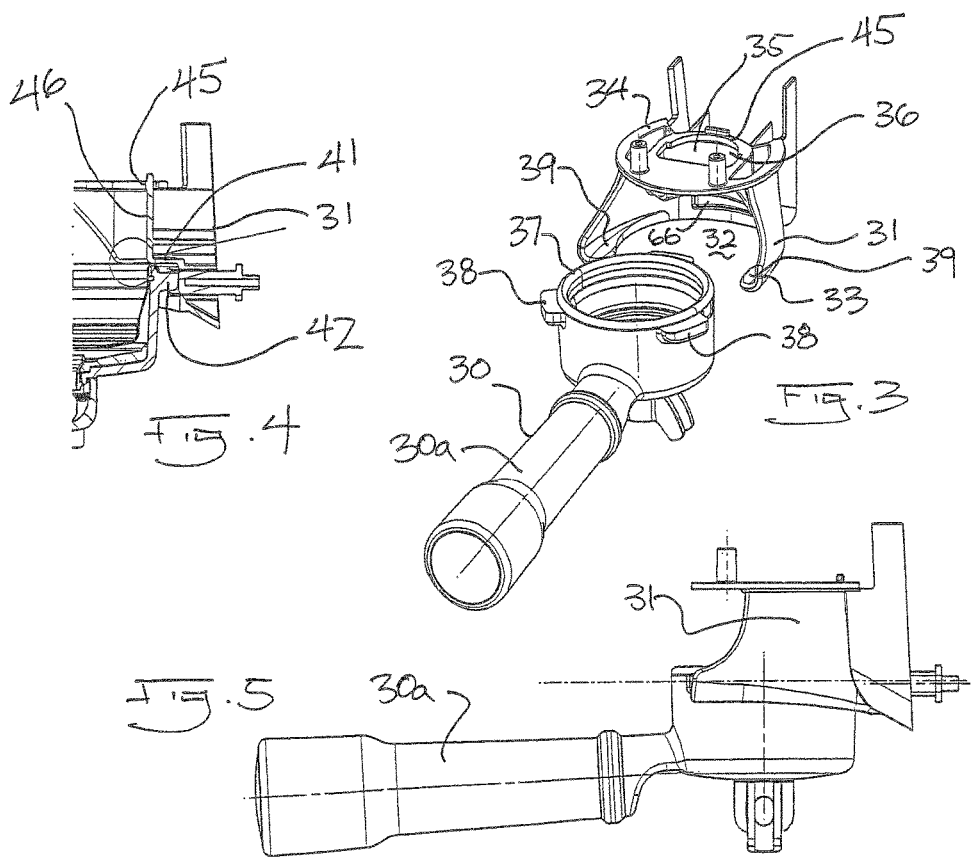

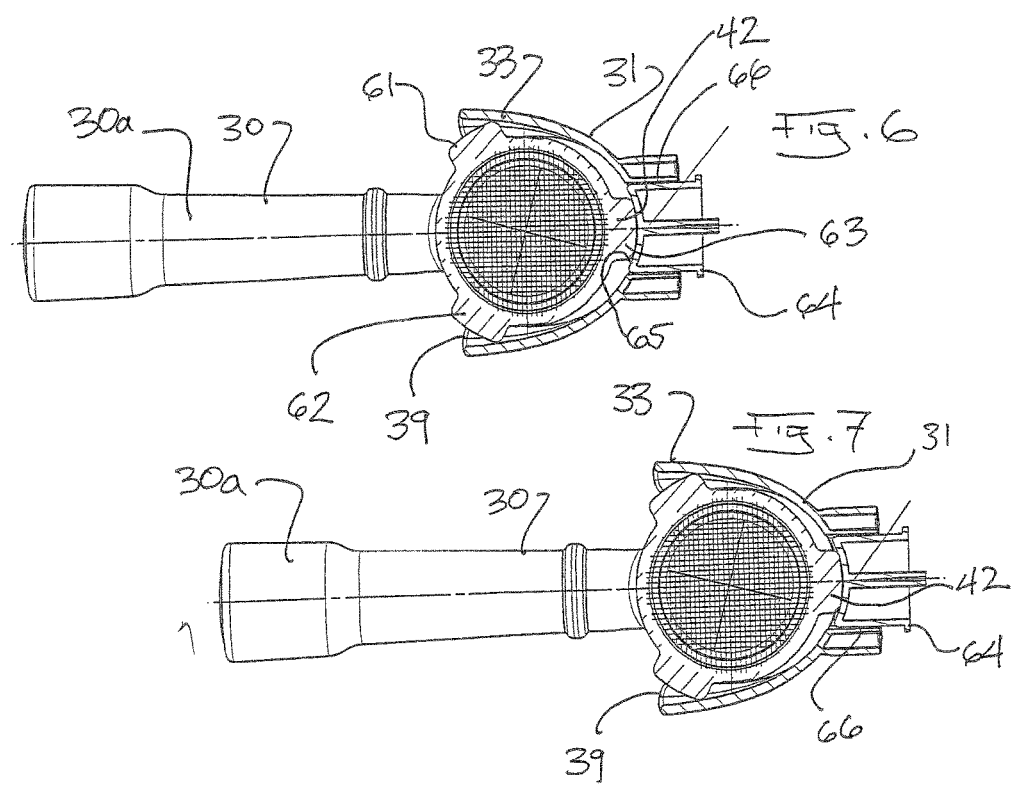

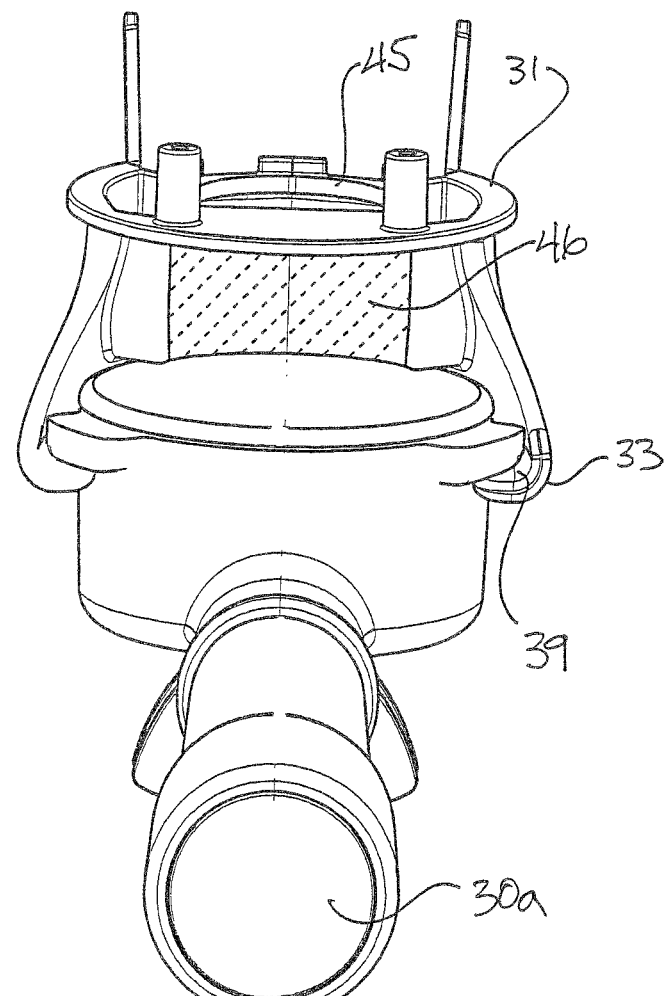

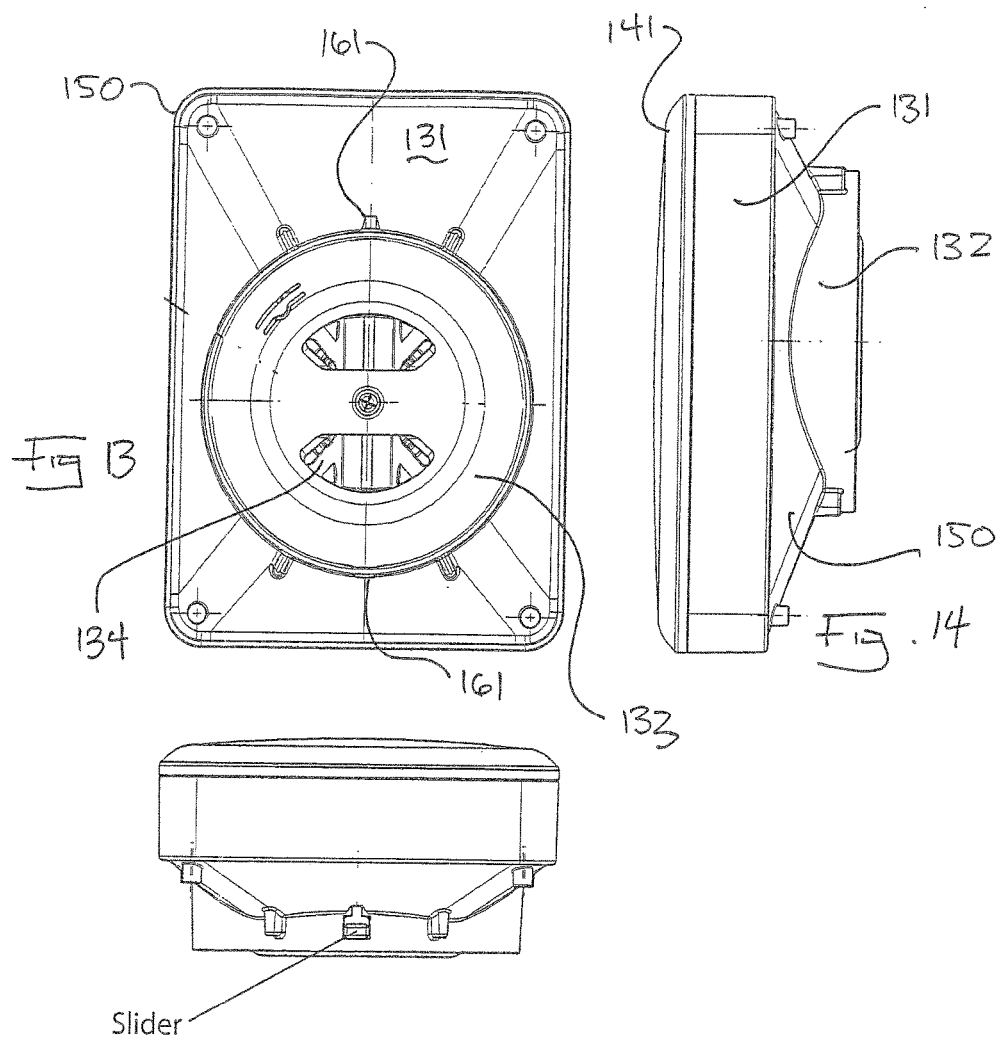

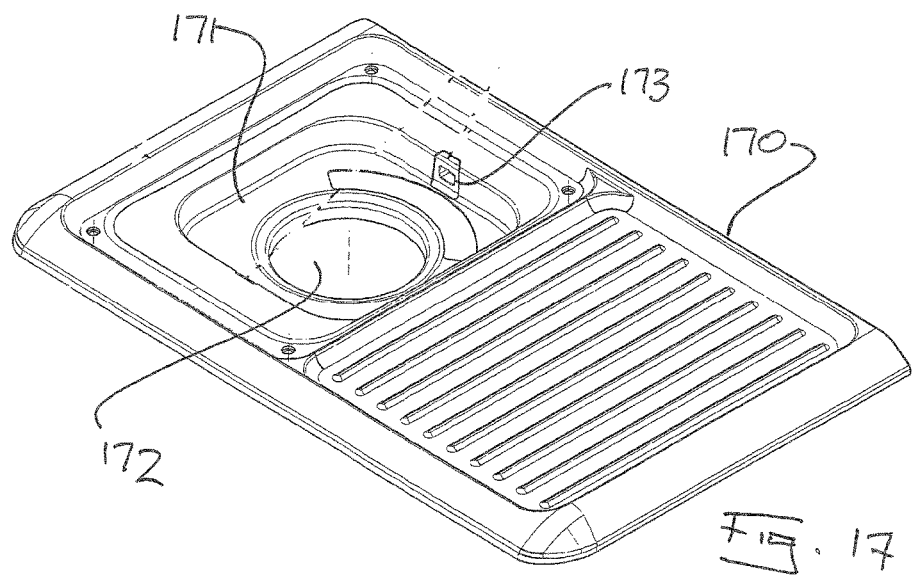
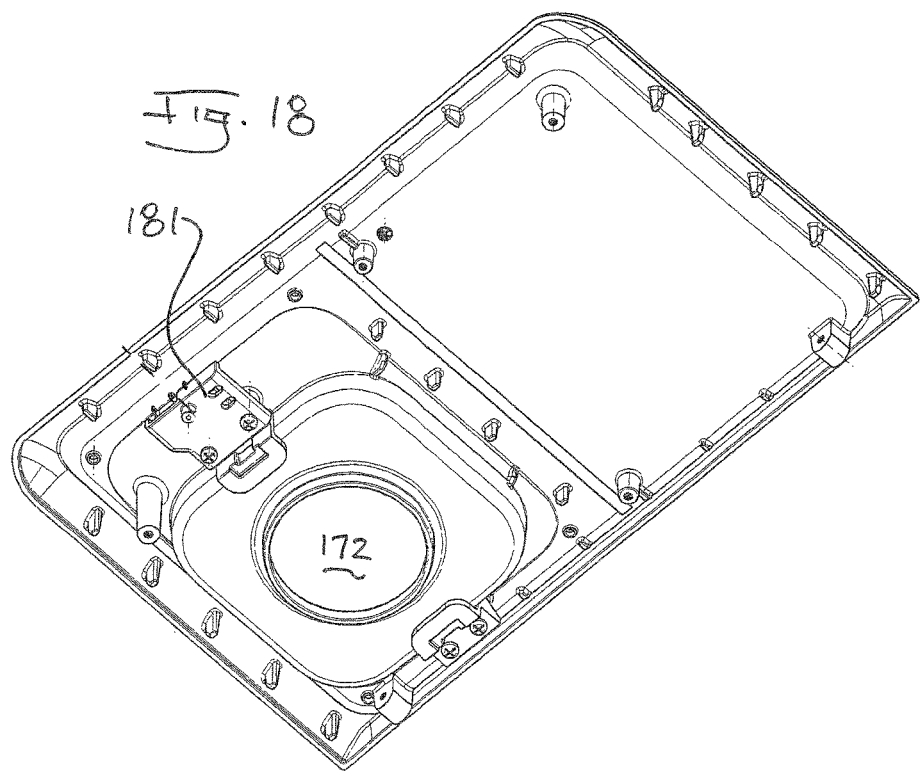

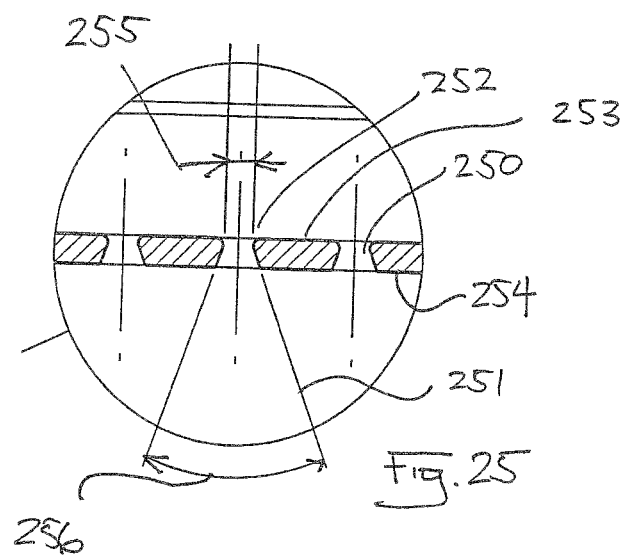

COFFEE GRINDER APPARATUS

FIELD OF THE INVENTION

The invention relates to espresso machines and more particularly to an espresso machine with a built-in coffee grinder and a number of features that enhance and compliment the operation of that grinder.

BACKGROUND OF THE INVENTION

The invention provides automation, sophistication and ease of use to consumers seeking an espresso machine with a built-in coffee grinder. It should be understood that the features forming the present disclosure may be used together in or in combination depending on a host of factors such as consumer preference and cost.

OBJECTS AND SUMMARY OF THE INVENTION

It is an object of the invention to provide an espresso machine with a built-in coffee grinder.

In selected embodiments an electrical switch toggles between a one cup dose and a two cup dose. The switch works in conjunction with a dose strength adjustment. Alteration of the dose strength adjustment alters the dose strength for both the one cup of two cup dose settings.

In other embodiments, an internal coffee grinder dispenses into a portafilter basket that is held in a hand free support cradle.

In other embodiments, the cradle cooperates with a switch that is activated by the portafilter. A single depression of the switch with the portafilter automatically dispenses a dose that is pre-established by the setting of and adjustable with the dose strength adjustment. If the same switch is depressed continuously rather than momentarily, the grinder will operate until the switch is released or a maximum pre-determined grind time is reached.

In particularly embodiments of the invention, the portafilter is supported below the coffee grinder by a support cradle. The cradle is adapted to hands free operation and is optionally adapted to funnel or focus grinds into the filter basket, minimising overspilling when filling the basket.

In some embodiments of the invention, the upper burr head of the grinder is retained by an upper burr bracket. The combination of upper burr head and burr bracket allows the upper burr head to removed and replaced without having to re-set the grind size.

In some preferred embodiments, the coffee grinder further comprises a constricted area that leads to a grind chute. The constricted area acts to reduce the volume of the ejected ground coffee particles thus reducing inadvertent overfilling of the portafilter basket.

In other selected embodiments, the grinder is associated with a coffee bean hopper. The hopper may be removed from the machine without beans falling through the bean feed opening. A safety mechanism prevents the grinder from operating unless the hopper is in place.

In yet other embodiments, the espresso machine comprises a separate and removable tamper that may be attached to the machine and used in place or removed by the user.

In further embodiments, the machine further comprises a drip tray that collects liquid and spilt coffee grinds separately. The separation of dry from wet waste reduces sink blockages.

In yet other embodiments the espresso machine comprises a pullout storage tray that is normally concealed, but revealed when the drip tray is removed.

BRIEF DESCRIPTION OF THE DRAWING FIGURES

In order that the invention be better understood, reference is now made to the following drawing figures in which:

FIG. 3 is a perspective view of a portafilter and cradle;

FIG. 4 is cross sectional detail of the cradle and portafilter;

FIG. 5 is a side elevation of the portafilter inserted into the cradle;

FIG. 6 is a partially cross sectioned top plan view of the portafilter and cradle;

FIG. 7 is a partially cross sectioned top elevation of the cradle and portafilter showing the portafilter depressing an activator;

FIG. 8 is a front perspective view of the portafilter and cradle;

Figure 12A:
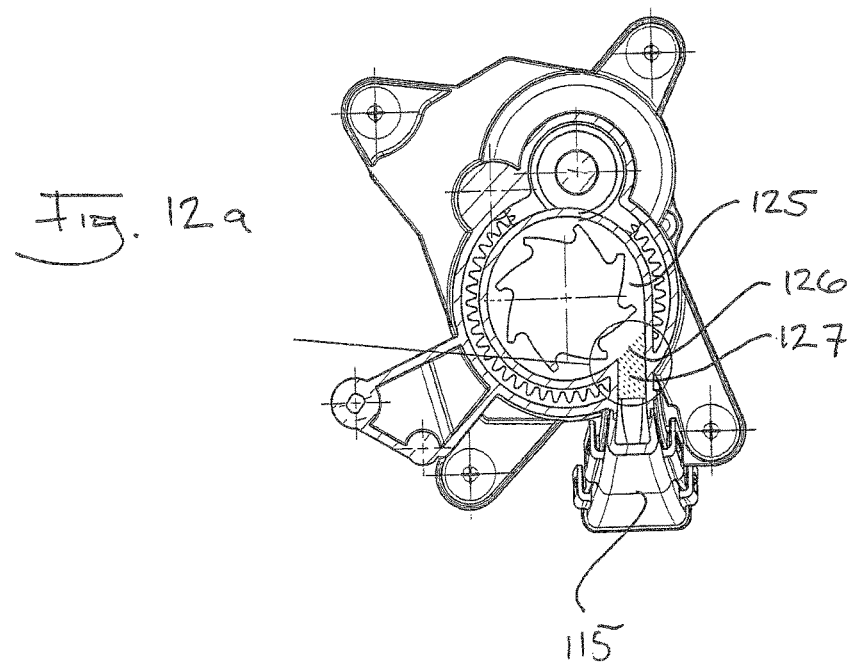
Figure 12B:
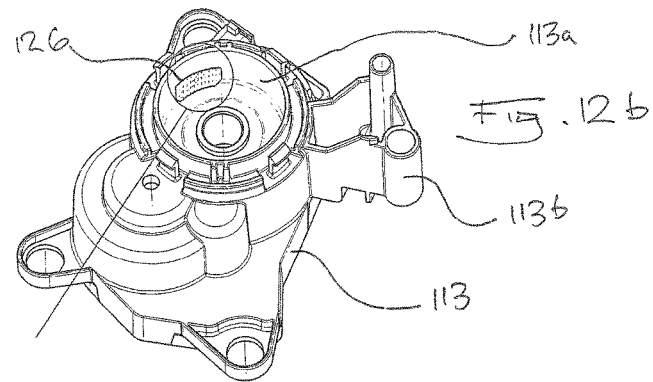
Figure 12C:
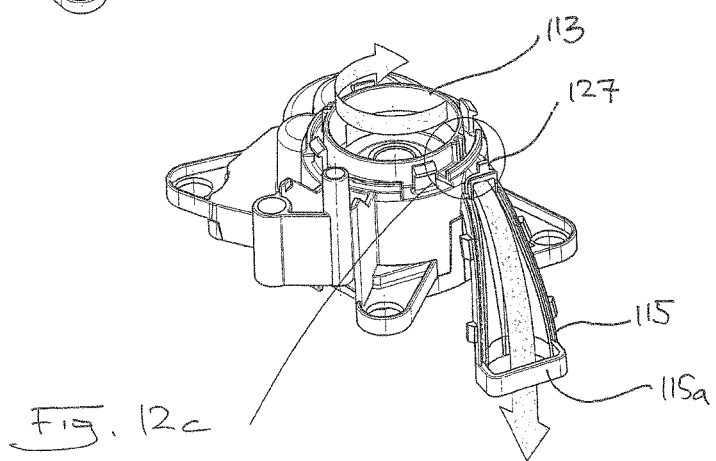
Figure 12D:
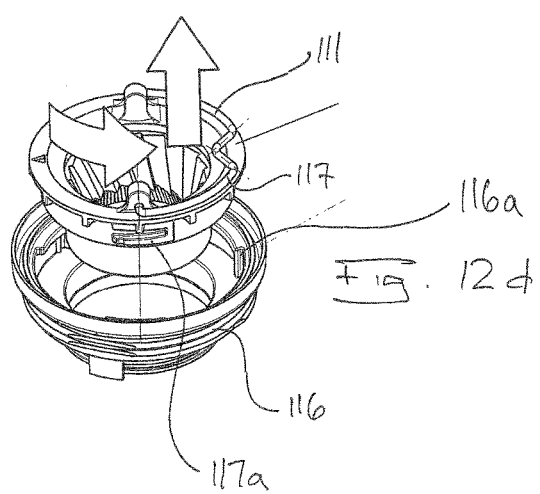
Figure 15:
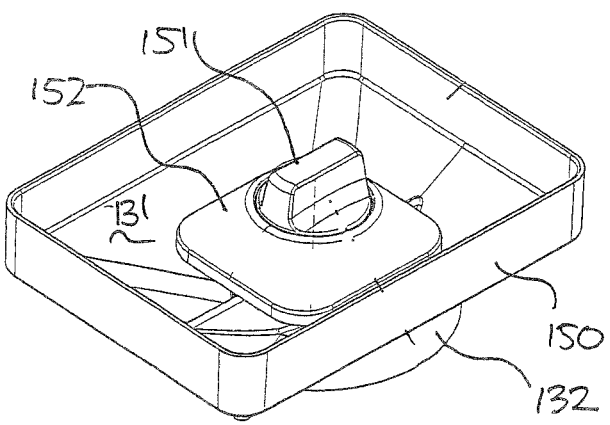
Figure 16:
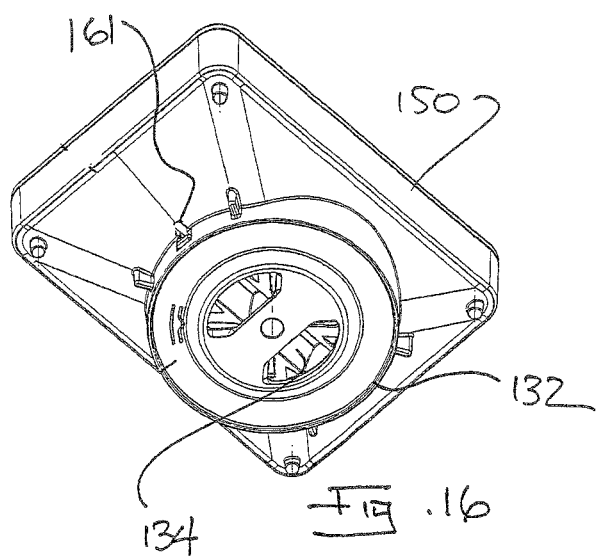
Figure 19:
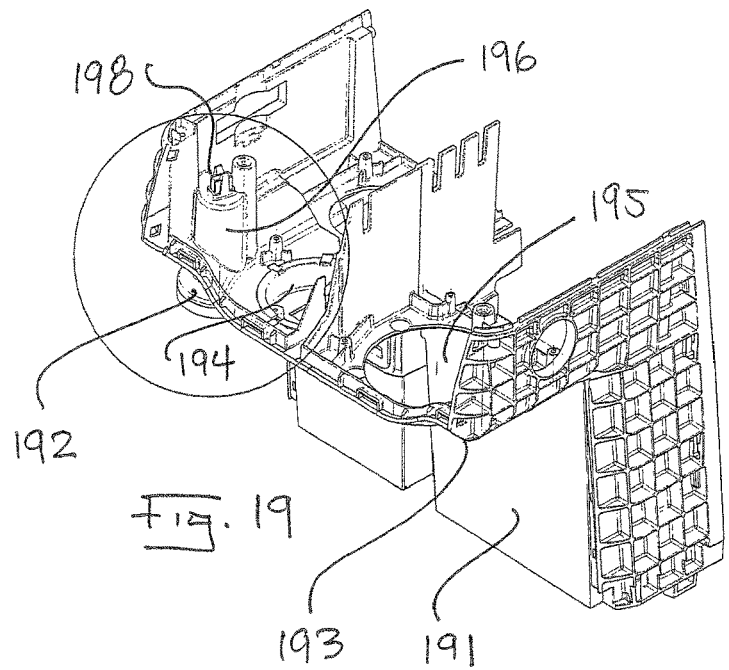
Figure 20:
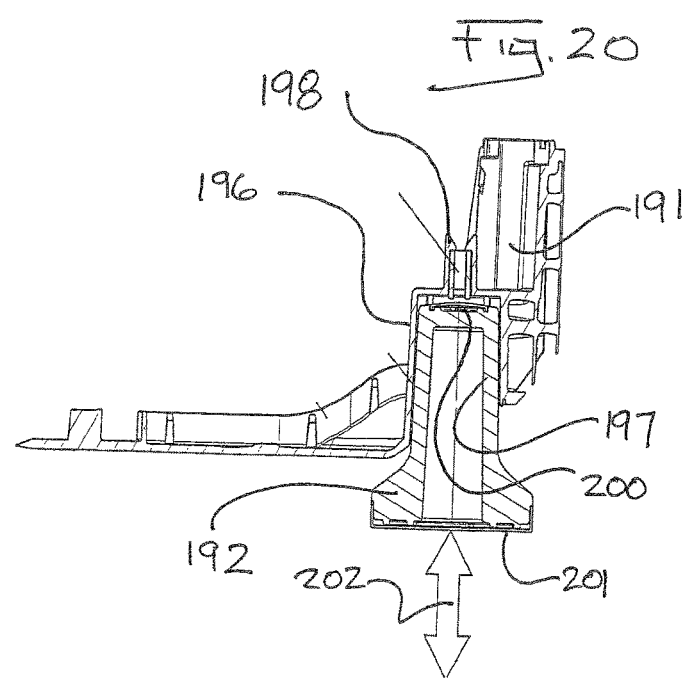
Figure 21:
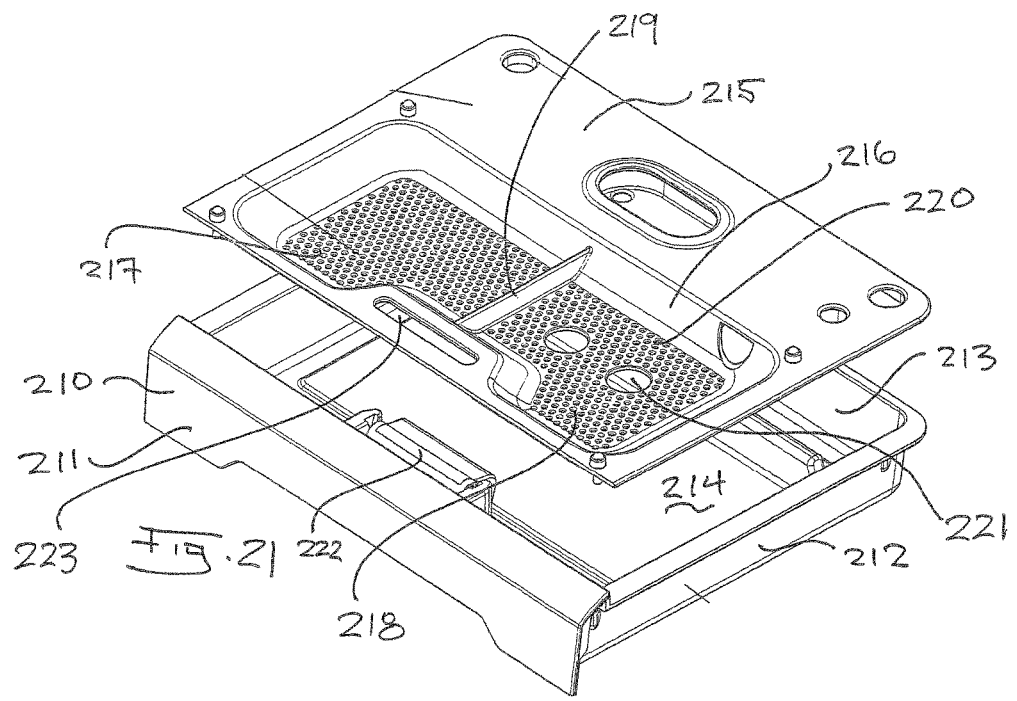
Figure 22:
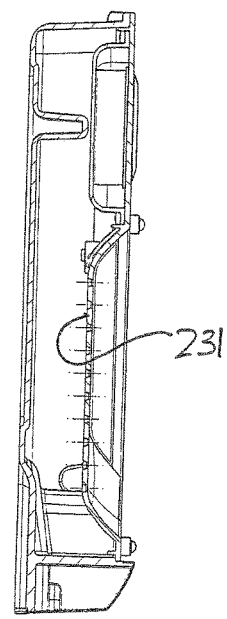
Figure 23:
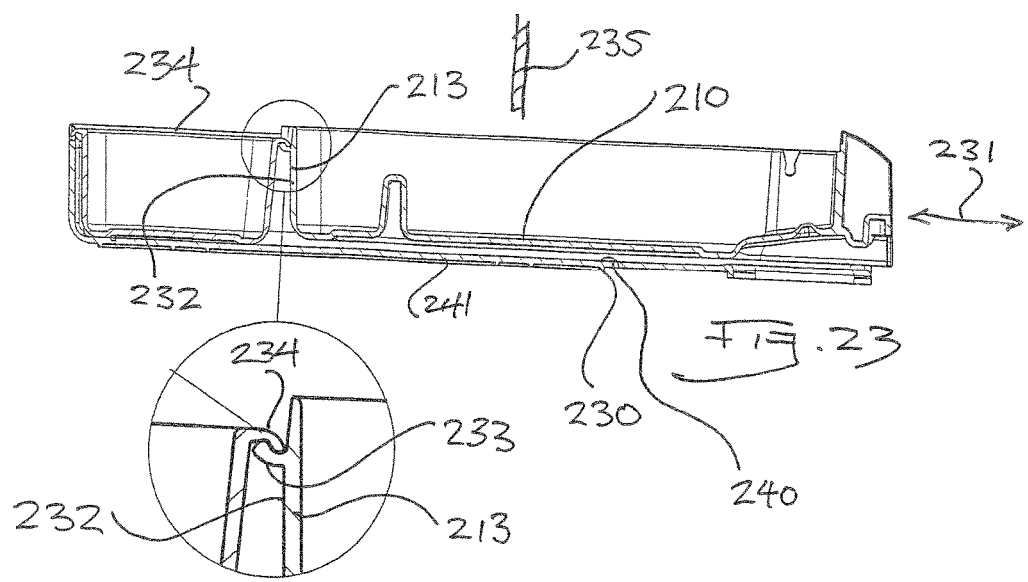
Figure 24:
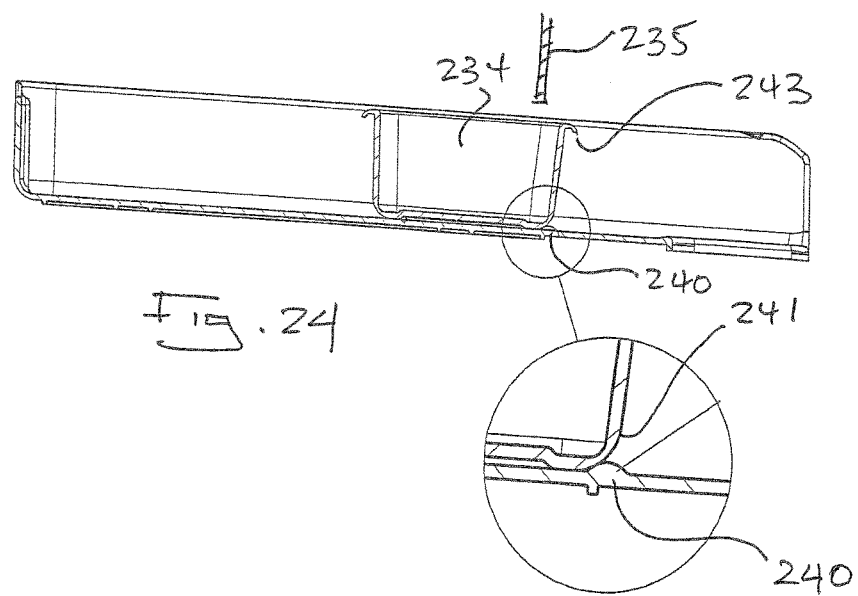

FIG. 12*a* is a cross sectional detail of the grinder illustrating the constriction area;

FIG. 12*b* is a perspective view of the conical burr grinder casing as integrated with the motor and gearbox casing and illustrating the discharge opening for grinds;

FIG. 12C is a perspective view of the grinder casing illustrating the flow path of the grinds out of the grinder and through the tapered chute;

FIG. 12*d* is an exploded perspective of the removable upper burr and upper burr bracket;

FIG. 13 is a bottom plan view of a hopper;

FIG. 14 is a side elevation of hopper shown in FIG. 13;

FIG. 15 is a perspective view of the hopper depicted in FIG. 13 with the lid removed;

FIG. 16 is a bottom perspective view of the hopper;

FIG. 17 is a perspective view of the machine's hopper receiving recess;

FIG. 18 is a bottom perspective view of the recess area depicted in FIG. 17;

FIG. 19 is a perspective view of a portion of the chassis illustrating the location of the tamper and its receptacle;

FIG. 20 is a cross sectional view of the chassis and removable tamper;

FIG. 21 is an exploded perspective of the drip tray and drip tray cover;

FIG. 22 is a cross section through the drip tray and drip tray cover;

FIG. 23 is a cross sectional view of the drip tray and storage tray, both fully inserted into a stationery carriage associate with the espresso machine;

FIG. 24 is a cross section of the carriage and storage tray with the drip tray removed; and FIG. 25 is a cross sectional view through perforations in the drip tray.

BEST MODE AND OTHER EMBODIMENTS

Figure 1:
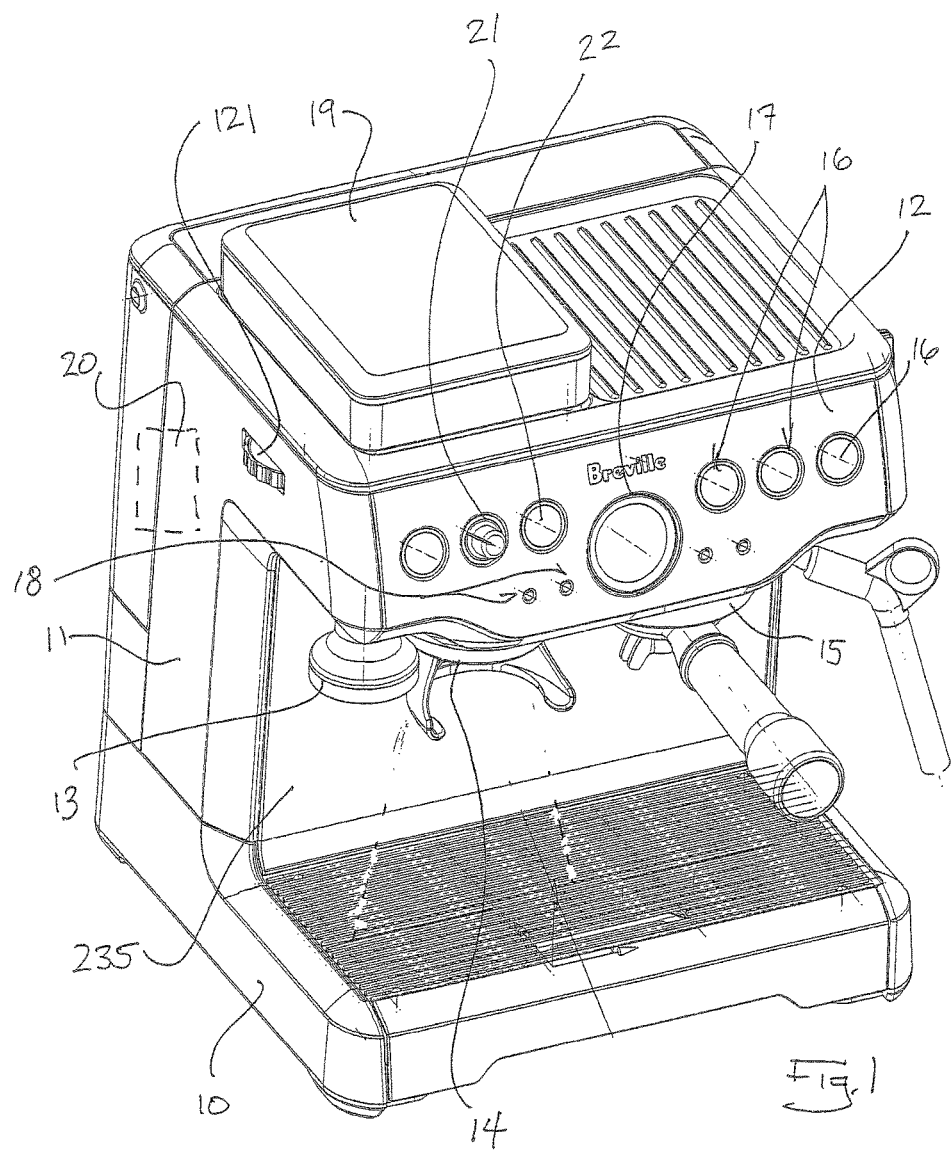
FIG. 1 is a perspective view of an espresso machine according to the teachings of the present invention.

As shown in FIG. 1, an espresso machine with built-in coffee grinder comprises a base 10 that supports a carriage within which is contained a drip tray with cover and a concealed storage tray. An upright portion 11 extends from the base 10 and supports a ledge 12. The underside of the ledge features a removable tamper 13, a portafilter support cradle 14 that is located below an internal coffee grinder and the group head or brew head 15. The front face of the ledge comprises various user controls 16, a pressure gauge 17 and various indicators 18. A removable bean hopper 19 discharges beans into the internal grinder. An internal microprocessor 20 receives the various user inputs and operational parameters produced by the machine's internal sensors and using these, controls the operation of the grinder, indicators and the machine's boiler, hot water and steam systems.

Figure 2:
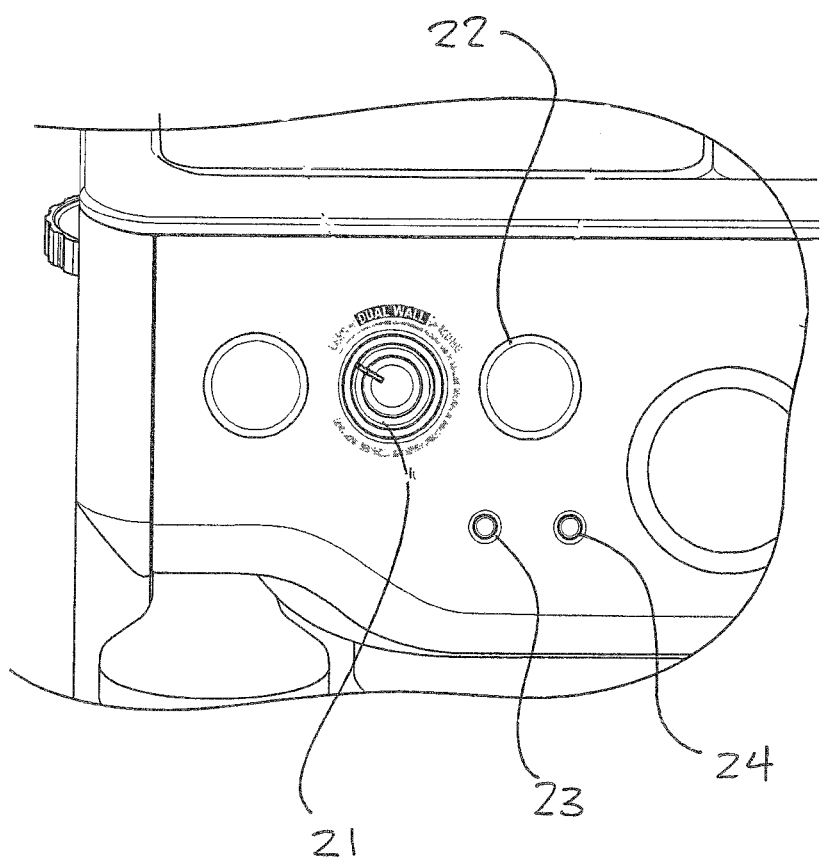
FIG. 2 is an elevation of some of the user controls associated with the machine depicted in FIG. 1.
Figure 10:
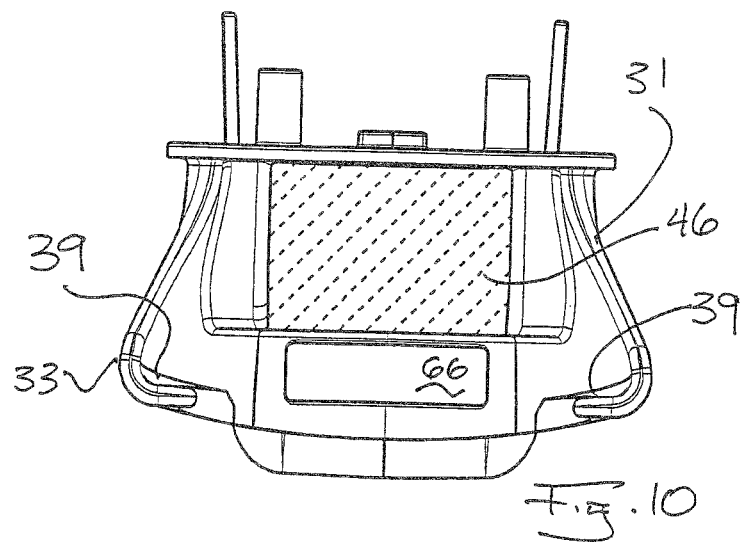
FIG. 10 is a front elevation of the cradle with the portafilter removed.

As shown in FIG. 2 the user operated grind controls include a variable dose strength adjustment knob 21 and a dose toggle switch 22. The dose strength adjustment knob is in this example a variable resistor with 11 discreet settings. In this example, settings are communicated to a microprocessor that uses the settings to control the operation of the built-in grinder's electrical motor. Each of the discreet or continuous settings determined by the strength adjustment knob 21 corresponds to a duration of operation of the grinder. In effect, less operation time means less grinds and thus weaker coffee and longer operation of the grinder results in more coffee being delivered to the portafilter and thus a stronger brew. It will be appreciated that, for example, a linear resistor may be used in place of a rotary one and digital controls may be employed in more sophisticated examples.

The dose toggle switch 22 toggles between single cup and double cup dose settings. The toggle switch 22 is associated with, for example, two indicators 23, 24. In this example, the indicators 23, 24 are LED indicators that indicate whether a single cup dose 23 or double cup dose 24 has been selected by the user operating the dose toggle switch 22.

The micro processor that is controlled by the dose strength adjustment setting 21 will apply the strength adjustment setting to both the single and double cup dose time settings that are used to control the grinder. Accordingly, operation of the strength adjustment setting 21 while the toggle 22 is set for a single cup dose will result in a comparable dose adjustment being automatically made when the toggle is changed to a double cup dose. Similarly, strength adjustments made when the toggle is set for a double cup are remembered by the microprocessor and applied appropriately to single cup doses. The microprocessor applies an algorithm or get stored values from, for example, a look-up table or the like.

The dose strength adjustment setting 21 is desirable for at least two different reasons. First, normal manufacturing tolerances within the machine's coffee grinding heads result in differences in the outputs of different machines. The dose strength adjustment allows this inconsistency to be rectified with a relatively simple user adjustment. Further, the grind size is determined by, for example, the distance between the burrs and the grinder and because this distance is user adjustable, adjustments in the duration of the operation time of the grinder are required to compensate for the variation in grind size setting. For example, coarser grinds will provide a greater output (by weight) for a given operating time than when set to a finer grind. That is, finer particles take longer to grind. Enough range is provided in the dose strength adjustment 21 to deal with the full range of user selectable grind size settings.

As shown in FIG. 3, the portafilter 30 is retained by a filling cradle 31 while fresh grinds from the grinder are being dispensed into it. The cradle 31 comprises a "U" shaped receiving opening 32 flanked by a symmetrical pair of wings 33. An upper surface 34 of the cradle is formed with a dispensing opening 35 that cooperates with a generally "U" shaped guide channel 36 that leads grinds toward the portafilter's filter basket (not shown in FIG. 3). The portafilter 30 has circular upper periphery 37 for receiving the filter basket. The upper periphery 37 is surrounded by, for example, three equally spaced tabs 38. The tabs 38 are used to engage the portafilter with the brew head during brewing operations. The brew head has helical slots that receive the tabs and which promote sealing of the filter basket against the underside of the group head when the portafilter is rotated into its final or brewing position.

The tabs 38 are also used to support the portafilter in a hands free manner while ground coffee is being dispensed into it. As shown in FIGS. 4-8, the rear tabs, being the ones closest to the portafilter's handle are supported by tapered ledges 39 that extend from the lower extremity of the wings 33. The ledges 39 taper from a maximum width toward the front of the cradle to a minimum width at the rear or deepest part of the cradle opening 32. As shown in FIG. 6, the two rear tabs 61, 62 are at least partially if not fully supported by the ledge 39 when the portafilter is inserted into the cradle 31. In this orientation, the front tab 63 is adjacent to a reciprocating actuator 64 that cooperates with an electrical switch such as a microswitch. The actuator 64 has a curved front surface 65 that cooperates with the front tab 63. The actuator 64 fits within and slides relative to an opening 66 formed in the cradle between the wings 31. As shown in FIG. 7, the portafilter 30 may be advanced against the actuator 64 so that the actuator's switch can be operated in this way.

In a preferred embodiment, advancing the portafilter 30 against the actuator 64 (momentarily) and then releasing it sends a signal to the microprocessor that causes an automatic filling of the filter basket by actuating the grinder for a specified or preset time. This time depends on the setting of the dose strength adjustment setting 21 and the dose toggle switch 22. Pressing the front tab 64 of the portafilter against the actuator 64 and holding it continuously in the position depicted in FIG. 7 causes the microprocessor to operate the grinder until pressure on the actuator 64 is released manually or a predetermined operating time for the grinder is reached.

The rear tabs 61, 62 of the portafilter, when resting on the ledges 39 of the wings 31 act as a pivot point. The weight of the portafilter's handle 30a causes an imbalance that is resisted by an internal downward facing ledge 41 formed above the front tab 42 when it is inserted into the cradle 31. In this way, the imbalance caused by the weight of the handle is resisted and the portafilter remains stable in the cradle, even when the user is not holding it in place.

Figure 9:
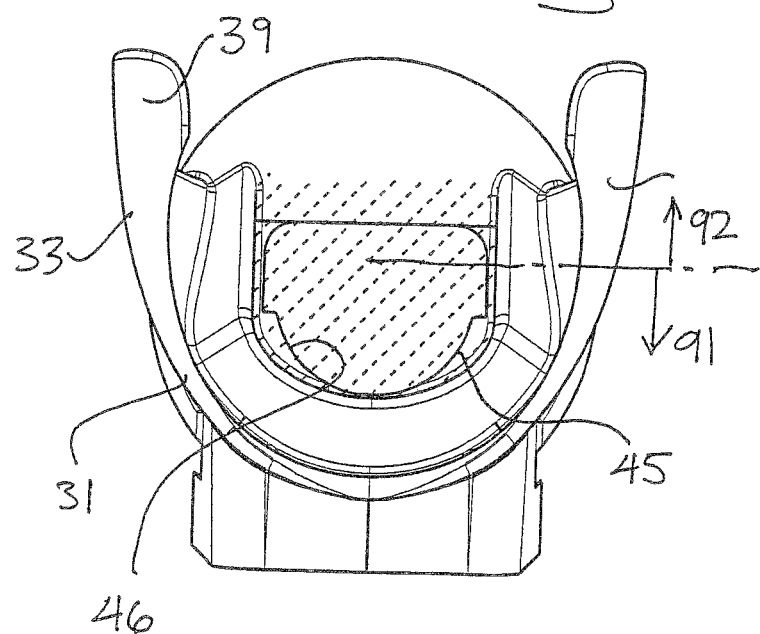
FIG. 9 is a bottom plan view of the cradle.

As shown in FIGS. 3 and 9, the dispensing opening 35 of the cradle includes an arcuate or curved rim portion 45. This curved portion of the opening 35 is located toward the front of the filter basket when the portafilter is inserted into the cradle. The curved portion 45 of the opening 35 cooperates with the curved guide channel 46 so that grounds are deposited toward the front half 91 of the filter basket rather than the rear half 92. These features contribute to the stability of the mound formed by the dispensed grinds, making spilling less likely.

Figure 11:
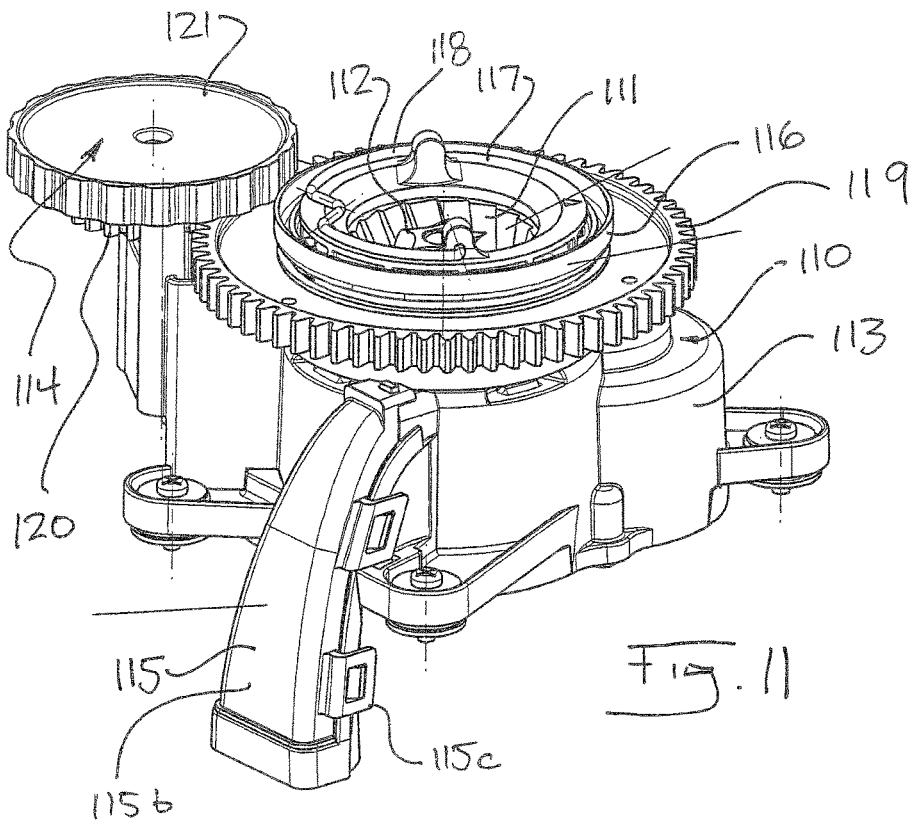
FIG. 11 is a perspective view of the grinder, gearbox and chute.

As shown in FIG. 11, the espresso machine contains an internal coffee grinder 110. The grinder 110 comprises an upper burr 111, a lower burr 112, a motor and gearbox case arrangement 113, a user grind size adjustment mechanism and a dispensing chute 115. In this example, a conical burr grinder is used. Thus, the lower burr 112 is rotated by the motor and its gearbox with respect to the stationery upper burr head in. The upper burr head 111 is removably retained by an upper burr bracket 116. The upper burr bracket 16 locates the removable upper burr head in a predictable and repeatable way relative to the fixed lower burr head 112. The upper burr head 111 is retained in the upper burr bracket 116 by a retaining ring 117 that carries a folding grip 118 that can be deployed and twisted so as to free the ring 117 from the bracket 116 allowing the upper burr head to be removed, maintained or replaced. The entire upper burr bracket may be rotated and thus displaced from the lower burr by a first adjustment gear ring 119. This gear ring 119 is rotated by a smaller or second adjustment gear 120 carried on the underside of a user adjustment dial 121. The user adjustment dial and its second gear 120 are supported for rotation by the housing of the motor and gearbox. Thus, rotation of the adjustment dial 121 causes a linear displacement of the upper burr bracket and hence the upper burr in. The closer the upper burr head in is to the lower burr head 120, the finer the grinds that are created. As shown in FIG. 12a, the receiving cavity 125 located below the burrs of the grinder features an exit opening 126. This exit opening 126 leads into a constriction area 127 that extends between the discharge opening 126 and the opening into the dispensing chute 115. In some embodiments, the constriction area 127 has parallel side walls that are configured to gently compress rather than disperse the grind particles. This light compression of the particles reduces the velocity and volume of the discharge and reduces the accumulation of static electricity in the particles and their interaction with the polymeric chute 115. Thus, grinds are discharged in a more compressed or compact way into the filter basket of the portafilter. This minimises the amount of spillage from the filter basket.

As shown in FIG. 12b, the motor, gearbox and part of the conical burr grinding assembly are contained within a unitary case 113. An upper portion of that case contains a recess 113a for receiving the lower burr 112. A discharge or exit opening 126 is formed into a side wall of the recess 113a. The case 113 also contains journal support structures 113b for supporting the user adjustment dial 121 and any gear train associated with it.

As shown in FIG. 12C, the ground coffee particles circulate within the casing 113 until such time as they enter the constriction area 127 prior to discharge from the tapered chute 115. Note that chute 115 terminates in a generally "D" shaped port 115a that cooperates with the configuration and shape of the dispensing opening 35 formed in the filling cradle 31 (see FIG. 3). With reference to FIG. 11, it can also be appreciated that the chute 115 is provided with a removable cover 115b that is attached by clips 115c, allowing the interior of the chute to be accessed for cleaning or maintenance.

As shown in FIG. 12d, the upper burr head 111 is removably retained by the upper burr bracket 116. In this example, the bracket 116 contains male internal bayonet features 166a that cooperate with female bayonet features 117a formed around the external circumference of the upper burr head 111. This allows for a positive mechanical engagement that is repeatable and predictable, facilitating the removal and reinsertion of the upper burr head 111 into its burr bracket 116.

As shown in FIGS. 13-16, the espresso machines internal grinder is supplied with coffee beans from a removable, external hopper 150. The hopper 115 comprises a bean reservoir 131, a coupling portion 132, a coupling mechanism and an optional transparent cover 141.

In this example, the coupling portion 132 is generally cylindrical and fits within a cooperating opening formed on an upper portion of an espresso machine. The receiving opening for the coupling portion 32 includes a pair of recesses for receiving reciprocating sliders 161 that extend radially from the cylindrical side walls of the coupling portion 132. As shown in FIG. 13, the underside 133 of the coupling portion 132 has one or more discharge openings 134 that can be blocked by a rotating shutter. The shutter is operated by a dial 151 that extends through a cover 152 within the reservoir 131. Rotating the dial 151 closes the shutter and simultaneously causes the safety sliders 162 to retract into the coupling portion 132. Retraction of the sliders 161 from the cooperating openings in the receiving portion of the espresso machine allows the hopper to be withdrawn, the shutter having already been closed to prevent beans from being inadvertently discharged. Retraction of the sliders from their cooperating openings in the espresso machine also deactivates an electrical switch associated with one or both receiving openings which has the effect of de-energising or locking out the power supply to the grinder's motor, thus rendering the grinder inoperative until such time as the hopper is reinstalled and the dial is twisted. Installation of the hopper by twisting the dial causes the sliders to extend and thus rendered the grinder's motor operative. This arrangement is a safety feature that prevents the grinder's motor from being operated unless the hopper is securely in place.

As shown in FIGS. 17 and 18, an upper portion of the espresso machine features, for example, a top cover 170 having a recess 171 for receiving the body of the hopper and opening 172 for receiving the coupling portion of the hopper. The recess 71 features a pair of openings or sleeves 173 for receiving the sliders. As shown in FIG. 18, a microswitch 181 is mounted under the cover, adjacent to one or both of the receiving openings 173. The microswitch 181 cooperates with the espresso machines micro processor for the purpose of disabling the grinder's motor once the sliders are retracted.

As shown in FIGS. 19 and 20, the chassis 191 of the espresso machine supports a removable coffee tamper 192. In this example, the chassis 191 includes a frontal overhanging ledge 193. The ledge 193 has openings 194, 195 for receiving relevant portions of the machine's grinder and group head. The underside of the ledge 193 also features a tapered recess 196 for receiving a removable tamper 192. The tamper 192 has an elongated handle 197 that is tapered to cooperate snugly with the receiving recess 196. A magnet 198 is located in association with the recess 196 and preferably on or adjacent to the uppermost extremity of the recess 196. The coffee tamper 192 features a metallic cap 200 that is attracted by the magnet and assists in retaining the tamper within the recess 196. The tamper 192 has an enlarged head 201 that is used to compress ground coffee into the filter basket. It can be used in the orientation depicted in FIGS. 19 and 20, that is, inserted into the recess. In the alternative, it can be removed and reinserted 202, at will, by the user. In preferred embodiments, the tamper and its recess are located conveniently adjacent to the coffee grinds dispenser, as indicated by the relationship between the recess 196 and the opening in the chassis for the grinder 194 shown in FIG. 19.

The espresso machine also supports a removable drip tray and drip tray cover as shown in FIGS. 21-23. The cover may be located under a grille (not shown). As shown in FIG. 21, the drip tray 210 comprises a facia 211, side walls 212 and a rear wall 213 that define a liquid receptacle 214. The receptacle 214 has a cooperating drip tray cover 215. The cover 215 has a depressed area 216, the floor of which is perforated 217. The perforations are preferably tapered, having a larger diameter at the undersurface 231 and smaller diameter at the upper surface 218 of the drip tray cover. The perforations are adapted to trap coffee grinds above the tray, not letting an excessive amount of grinds into the receptacle 214. Thus, liquids trapped in the receptacle 214 can be disposed of in a kitchen sink without discharging an excessive amount of grinds into the sink. The depressed area 216 is subdivided by a barrier or wall 219. Waste grinds associated with the coffee grinder and tamper generally fall to the left of the wall 19 because the grinder and tamper are located to the left of and above this wall. The brew head is located to the right of and above the wall 219 (see FIG. 1). Thus, the perforated floor 220 on the right hand side of the wall 219 features one or more larger openings 221 that allowed brewed coffee waste to more easily flow into the receptacle 214. The tray also features a receptacle level indicator 222 that can be read through an opening 223 formed in the cover, in registry with the indicator 222.

As shown in FIG. 23 the drip tray 210 slides into and out of a receiving carriage 230 that is fixed with respect to the espresso machine and preferably located at a lowermost portion or base 10 of the espresso machine. The drip tray 210 is adapted for reciprocal motion 231 relative to the carriage 230. As shown in FIG. 23, the rear wall 213 of the drip tray has a rear surface 232 from which extends a hook feature or upturned lip 233. The upturned lip 233 is adapted to receiving a hook feature or cooperating downturned lip 234 formed on an exterior of a side wall of a storage tray 234. The storage tray 234 is also adapted for reciprocal sliding motion within the stationery carriage 230. As shown in FIG. 23, both the storage tray 234 and the drip tray 210 are fully inserted into the carriage 230. In this orientation, the perforated portion of the drip tray is generally exterior to an adjacent external front surface 235 of the espresso machine. Thus, the storage tray 234 and the rear of the drip tray are concealed behind the front surface 235. In this orientation, the depressed, perforated area of the drip tray cover (see FIG. 21) is external to the before mentioned surface 235, but the remainder of the drip tray and its cover, together with the storage tray 234 are effectively concealed within the espresso machine.

A one or more small bumps, protrusions or raised lip 240 is formed into the upper surface of the floor 241 of the carriage 230. The protrusion 240 is external to the front surface 235 of the espresso machine. During its reciprocal motion 231, the underside of the drip tray does not contact the protrusion 240 however, because the drip tray and the storage tray are interconnected by the hook-like features 233, 234, the storage tray will be carried forward with the drip tray when the drip tray is removed from the machine. As shown in FIG. 24, the storage tray 234 will eventually be carried forward by the drip tray (not shown) until a forward lower edge 241 of the storage tray contacts the protrusion 240. This will cause the front of the storage tray 234 to rise or lift relative to the upturned lip 233 of the drip tray. Thus, upon contract with the protrusion 240, the storage tray becomes disconnected or decoupled from the drip tray at approximately the time that its front edge 243 protrudes externally of the adjacent front surface 235 of the espresso machine. This makes full removal of the concealable storage tray by the user easy. Repositioning of the storage tray into the carriage and urging it toward the rear of the carriage using the drip tray causes the hook-like features 233, 234 to engage thus establishing a coupling between the drip tray and the storage tray that is required for subsequent removal of the storage tray.

FIG. 25 illustrates a cross sectional detail of the perforations found on the drip tray cover 215, particularly in the depressed area 216 provided in the example depicted in FIGS. 21-23. As shown in FIG. 25 the circular perforations 250 are tapered 251 having the smaller diameter 252 on the upper surface 253 and the larger diameter on the lower surface 254. In this example, the hole diameter 255 at the upper surface is about 2.2 mm. The rim of the upper opening may be radiused. As illustrated in this example, the taper is a downward opening taper of approximately 20 degrees 256.

While the present invention has been disclosed with reference to particular details of construction, these should be understood as having been provided by way of example and not as limitations to the scope spirit of the invention.

What is claimed is:

1. A coffee grinding apparatus for co-operating with a removable portafilter having a handle, the apparatus including:
   a cradle for supporting the portafilter;
   an actuator adjacent to the cradle for co-operating with the portafilter;
   a downward facing ledge is formed above a front tab of the portafilter when supported by the cradle to resist imbalance of the portafilter; and
   wherein, when the portafilter is supported by the cradle and advanced forward, the front tab of the portafilter further contacts the actuator to operate an electrical switch, thereby causing a signal to be sent to a microprocessor for delivering coffee grinds to the portafilter.

2. The apparatus according to claim 1, when the portafilter has a plurality of tabs; and the cradle supports the tabs of the portafilter while ground coffee is being dispensed.

3. The apparatus according to claim 2, wherein the portafilter has circular upper periphery for receiving a filter basket; and the upper periphery is surrounded by the plurality of tabs.

4. The apparatus according to claim 2, wherein the cradle is in the form a "U" shaped receiving opening flanked by a symmetrical pair of wings.

5. The apparatus according to claim 4, wherein each of the wings form a tapered ledge that extends from the lower extremity, such that tabs closest to the handle of the portafilter are supported by tapered ledges.

6. The apparatus according to claim 5, wherein each tapered ledge tapers from a maximum width to a minimum width, wherein the minimum width is toward the deepest part of the cradle opening.

7. The apparatus according to claim 5, including rear tabs supported by the tapered ledges to provide a pivot point for the portafilter, whereby weight of the portafilter handle causes an imbalance that is resisted by the downward facing ledge.

8. The apparatus according to claim 1, wherein the actuator has a curved abutment surface that engages the front tab; such that the portafilter is advanceable against the actuator to operate the switch.

9. The apparatus according to claim 8, wherein the actuator is located within relative to an opening formed between the wings of the cradle.

10. The apparatus according to claim 1, the apparatus further including: an upper surface forming a dispensing opening that cooperates with a generally "U" shaped guide channel for directing grinds toward the portafilter.

11. The apparatus according to claim 10, wherein the dispensing opening forms a curved rim portion that is located about the front of a filter basket when the portafilter is inserted into the cradle.

12. The apparatus according to claim 11, wherein the curved rim portion cooperates with the guide channel so that grounds are deposited toward a front half of the filter basket.

13. The apparatus according to claim 1, wherein the signal to the microprocessor causes an automatic filling of the filter basket by actuating a grinder for a predetermined time, the predetermined time being dependant on setting of a quantity adjustment setting and a dose toggle switch.

14. The apparatus according to claim 1, wherein pressing and holding the front tab against the actuator causes the microprocessor to operate the grinder until pressure on the actuator is released or a predetermined operating time has passed.

* * * * *